US005393597A

United States Patent [19]
Childers et al.

[11] Patent Number: 5,393,597
[45] Date of Patent: * Feb. 28, 1995

[54] OVERVOLTAGE PROTECTION ELEMENT

[75] Inventors: Richard K. Childers, Redwood City; John H. Bunch, San Mateo, both of Calif.

[73] Assignee: The Whitaker Corporation, Wilmington, Del.

[ * ] Notice: The portion of the term of this patent subsequent to Nov. 16, 2010 has been disclaimed.

[21] Appl. No.: 949,716

[22] Filed: Sep. 23, 1992

[51] Int. Cl.[6] .................. B32B 5/16

[52] U.S. Cl. .................. 428/242; 428/244; 428/247; 428/251; 428/252; 428/255; 428/272; 338/20; 338/21

[58] Field of Search .............. 428/272, 242, 244, 247, 428/251, 252, 255; 338/20, 21

[56] References Cited

U.S. PATENT DOCUMENTS

| | | | |
|---|---|---|---|
| 4,726,991 | 2/1988 | Hyatt et al. | 428/329 |
| 4,865,892 | 9/1989 | Winfield et al. | 428/34.9 |
| 4,889,963 | 12/1989 | Onai | 174/129 R |
| 5,262,754 | 11/1993 | Collins | 338/21 |

*Primary Examiner*—George F. Lesmes
*Assistant Examiner*—C. W. Raimund
*Attorney, Agent, or Firm*—Flehr, Hohbach, Test, Albritton & Herbert

[57] ABSTRACT

An overvoltage protection element which comprises a fabric comprising insulating threads or strands of predetermined thickness having interstices extending therethrough and non-linear material filling said interstices.

10 Claims, 2 Drawing Sheets

OVERVOLTAGE PROTECTION ELEMENT

FIELD OF THE INVENTION

This invention relates generally to an overvoltage protection element, and more particularly to an overvoltage protection element which can replace discrete devices presently used in protecting electronic circuits from disruptive and/or damaging effects of overvoltage transients.

BACKGROUND OF THE INVENTION

There are a number of devices which use materials having non-linear electrical response (hereinafter non-linear material) for overvoltage protection. These devices use non-linear material comprising finely divided particles dispersed in an organic resin or insulating medium. The material is placed between contacts and responds or switches at predetermined voltages. U.S. Pat. No. 4,977,357 is directed to such a material which can be placed between and in contact with spaced conductors to provide a non-linear resistance therebetween; the material comprises a matrix comprised of a binder and closely spaced conductive particles uniformly dispersed in the binder. U.S. Pat. No. 4,726,991 is directed to a switching material which provides electrical overstress protection against electrical transients, the material being formed of a matrix comprising separate particles of conductive materials and semi-conductive materials, all bound in an inorganic insulating binder to form the switching matrix. U.S. Pat. No. 3,685,026 describes a switching device employing a non-linear material.

In all such devices, the matrix has been applied between electrodes by forming the matrix material into the space between the electrodes, by applying a coating of the material to one electrode and then applying the second electrode, or by extruding, rolling/calendaring, pressing or molding the material into a thin sheet which is then sandwiched between electrodes. In all such methods, it is difficult to precisely achieve the desired thickness of the non-linear material and to provide intimate contact with the associated electrodes.

In copending application U.S. Ser. No. 07/949,709 filed Sep. 23, 1992, now U.S. Pat. No. 5,262,754 there is described an overvoltage protection element including a perforated layer of insulating material with the perforation filled with nonlinear material. The thickness of the nonlinear material is controlled by the thickness of the layer and the switching characteristics by the material selected. The perforations are formed by processing the layer of material. There is a need for an insulating layer which does not require processing, thereby lowering the cost of the element and simplifying the manufacture.

OBJECTS AND SUMMARY OF THE INVENTION

It is a general object of this invention to provide an improved overvoltage protection element having non-linear characteristics.

It is a further object of this invention to provide an overvoltage protection element which allows high volume multi-line package designs to be implemented for specific applications in connectors and electronic systems.

It is still a further object of this invention to provide an overvoltage protection element which includes a woven fabric substrate with the spaces between the fabric threads or strands filled with nonlinear material to extend from one surface of the woven substrate to the other.

It is a further object of this invention to provide an overvoltage protection element which allows high volume multi-line package designs to be implemented for specific applications.

It is a further object of this invention to provide an overvoltage protection element in which the electrical characteristics can be closely controlled by controlling the thickness of the fabric.

The foregoing and other objects of the invention are achieved by a circuit element that provides protection from fast transient voltages. The element includes a layer of woven fabric comprised of strands or threads of insulating material having a predetermined thickness and a non-linear overvoltage protection material contained within the spaces between the threads or strands and extending between surfaces of said fabric.

BRIEF DESCRIPTION OF THE DRAWINGS

These and other objects of this invention will be more clearly understood from the following detailed description when taken in conjunction with the drawings, in which.

DESCRIPTION OF THE PREFERRED EMBODIMENT

The overvoltage protection element of this invention includes a woven fabric layer or member 11, FIGS. 1-4, having spaced major surfaces 12, 13. As will be described, the fabric is selected to be of predetermined thickness. The fabric is formed of any electrically insulating material including threads or strands of natural materials such as silk, cotton, wool, etc., and synthetic threads or strands such as rayon, dacron, etc., or ceramic or refractory fibers. We have found that silk is an excellent fabric which is available in very small thicknesses, as small as 0.002 inches or less.

The primary consideration in selecting the fabric is that it have good electrical insulating properties, that it be easy to handle, and generally available.

Figure 2:
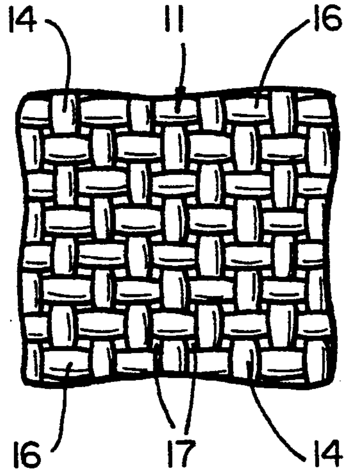
FIG. 2 is a plan view of woven fabric for use in this invention.
Figure 3:
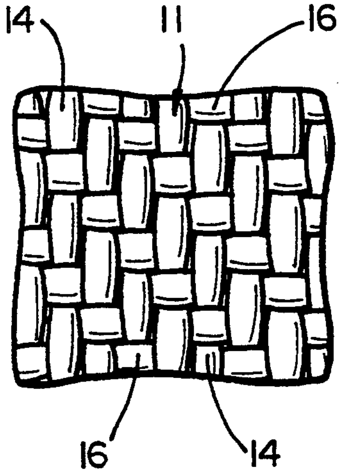
FIG. 3 is a plan view of another woven fabric for use in this invention.

The fabric 11 is formed with warp threads or strands 14 and filler threads or strands 16. The spaces between the warp and filler threads provides a plurality of spaces or interstices 17 which extend from the top surface 12 to the bottom surface 13. FIG. 2 shows a fabric in which the filler threads pass over and under alternate warp threads. FIG. 3 shows a fabric in which two warp threads are interlaced with one filler thread. It will become apparent that this invention can employ a variety of fabric configurations as long as the threads are insulating and there are interstices for receiving nonlinear material between the threads.

In accordance with this invention, the fabric is selected to have a predetermined thickness. The interstices or spaces between the fabric threads are filled with a suitable non-linear switching material of the type described in the patents referred to above, and preferably, a material such as taught in U.S. Pat. No. 4,977,357, comprising a binder and closely spaced conductive particles homogeneously distributed in said binder and spaced to provide electrical conduction by quantum mechanical tunneling. The on-state resistance and off-state resistance of the material are determined by the inter-particle spacing within the binder as well as by the electrical properties of the insulating binder. The binder serves two roles electrically: first, it provides a media for tailoring separation between conductive particles, thereby controlling quantum-mechanical tunneling, and second, as an insulator it allows the electrical resistance of the homogeneous dispersion to be tailored. During normal operating conditions and within normal operating voltage ranges, with the nonlinear material in the "off" state, the resistance of the material is quite high, in the $10^7$ ohm region or higher. For this material and devices made therefrom, conduction in response to an overvoltage transient is primarily between closely adjacent conductive particles and results from quantum-mechanical tunneling through the insulating binder material separating the particles. Conduction in response to an overvoltage transient, or overvoltage condition, causes the material to operate in its "on" state for the duration of the overvoltage situation.

The nonlinear switching material extends between the two major surfaces 12 and 13. The spaces may be filled by a variety of methods including calendaring, pressing, laminating, molding, extruding, dipping, wiping, painting, rolling, etc. The only requirement is that the interstices be completely filled so that the material extends coplanar with the upper and lower surfaces 12 and 13 of the fabric.

Figure 5:
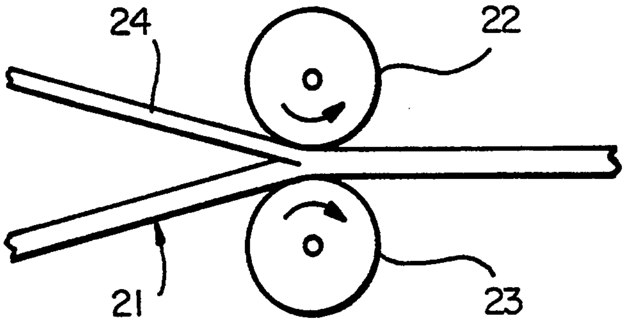
FIG. 5 is a schematic view showing a method of forming the overvoltage protection element of FIG. 1.

FIG. 5 shows forming the material by allowing a fabric 21 to pass between rollers 22 and 23. A sheet of nonlinear material 24 is also passed between the rollers and forced or extruded into the interstices. In some instances multiple passes through rollers may be required to extrude the material into the spaces. A typical element is shown in FIG. 1 where the nonlinear material 24 is shown in the interstices between the threads 14, 16.

It is to be observed that the overvoltage protection element can be formed in large sheets which can then be cut up for specific applications. The breakdown characteristics of the element are controlled by the type of non-linear material used and the thickness of the fabric 11; that is, the spacing between the major surfaces. The greater the thickness, or spacing, the higher the voltage required to cause switching. Thicknesses between 0.001 and 0.10 inches are satisfactory.

Figure 1:
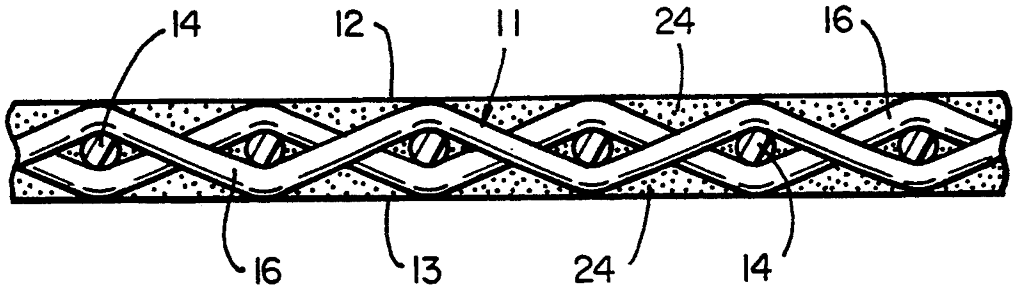
FIG. 1 is a sectional view of an overvoltage protection element in accordance with this invention.
Figure 4:
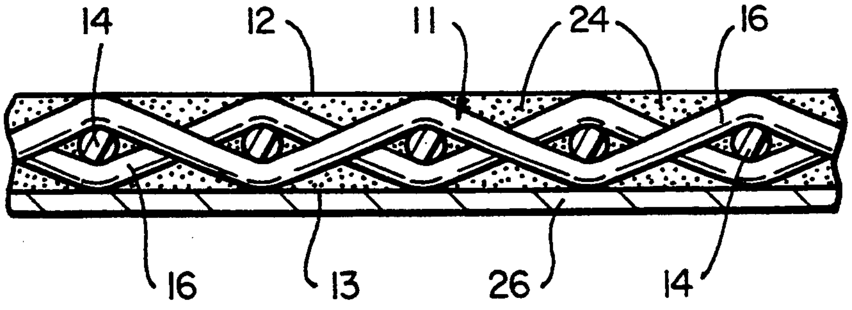
FIG. 4 is a sectional view of an overvoltage protection element including a ground plane.
Figure 6:
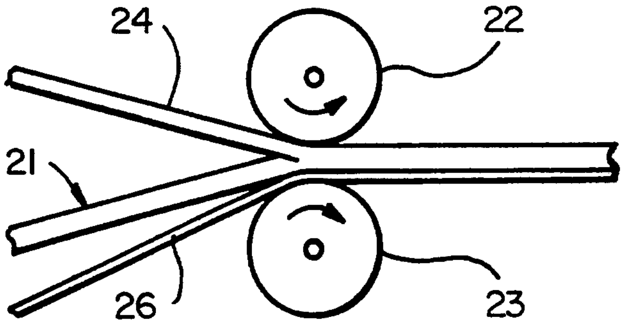
FIG. 6 is a schematic view showing a method of forming the overvoltage protection element shown in FIG. 4.

FIG. 4 shows the element of FIG. 1 with a ground plane 26. For example, referring to FIG. 6, the conductive ground plane may be affixed to the lower surface 13 during the rolling operation. In addition to the fabric 21 and nonlinear material 24 there is provided a conductive sheet 26 whereby the rolled element includes a conductive ground plane 26.

We have constructed an element using commercially available silk fabric of 0.002 inches thickness. The fabric was filled with a nonlinear material which comprised 40.6 percent polymer binder, 1.7 percent cross-linking agent, 15.4 percent hydrated alumina and 42.3 percent conductive powder. The binder was a medium durometer fluorosilicon rubber, LS-2840, available from Dow Corning, the cross-linking agent was CST peroxide, the hydrated alumina was Hydral 705, available from Alcoa, and the conductive powder was aluminum powder with 20 micron average particle size. Table I shows the typical electrical properties of an element made from this material formulation:

TABLE I

| | |
|---|---|
| Clamp voltage range: | 20–30 volts |
| Electrical resistance in "off" state (at 15 volts): | $>1 \times 10^7$ ohms |
| Electrical resistance in "on" state: | $<1$ ohm |
| Response (turn-on) time: | $<5$ nanoseconds |
| Capacitance: | $<5$ pico farads |

A second example of the material formulation, by weight, was 31.5 percent polymer binder, 1.3 percent cross-linking agent, 14 percent hydrated alumina and 53.2 percent conductive powders. In this formulation the binder was a medium durometer fluorosilicon rubber, LS-2840 available from Dow Corning, the cross-linking gent was CST peroxide, the hydrated alumina was Hydral 705 available from Alcoa, and the conductive powders were two aluminum powders, one powder with 4 micron average particle size at 42.1 percent, and the other powder with 20 micron average particle size at 11.1 percent. Table II shows the electrical properties of a device made from this material formulation:

TABLE II

| | |
|---|---|
| Clamp voltage range: | 20–30 volts |
| Electrical resistance in "off" state (at 10 volts): | $>2 \times 10^7$ ohms |
| Electrical resistance in "on" state: | $<1$ ohm |
| Response (turn-on) time: | $<5$ nanoseconds |
| Capacitance: | $<5$ pico farads |

Those skilled in the art will understand that a wide range of polymer and other binders, conductive powders, formulations and materials re possible. Other conductive particles which can be blended with a binder to form the nonlinear material in this invention include metal powders of beryllium, boron, gold, silver, platinum, lead, tin, bronze, brass, copper, bismuth, cobalt, magnesium, molybdenum, nickel, palladium, tantalum, tungsten and alloys thereof, carbides including titanium carbide, boron carbide, tungsten carbide and tantalum carbide, powders based on carbon including carbon black and graphite, as well as metal nitrides and metal borides. Insulating binders can include but are not limited to organic polymers such as polyethylene, polypropylene, polyvinyl chloride, natural rubbers, urethanes and epoxies, silicon rubbers, fluoropolymers and polymer blends and alloys. The primary function of the binder is to establish and maintain the inter-particle spacing of the conducting particles in order to insure the proper quantum-mechanical tunneling behavior during application of an electrical overvoltage situation.

Figure 7:
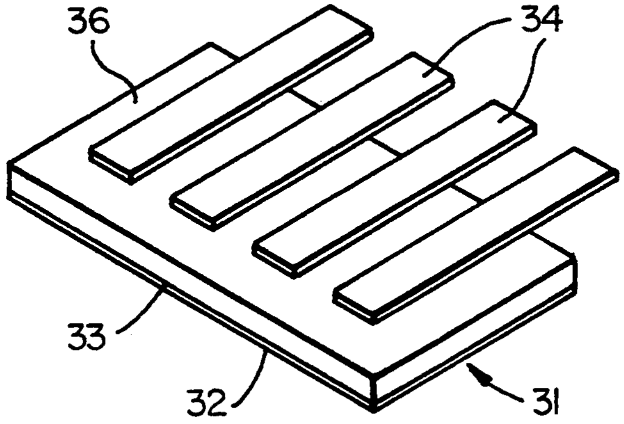
FIG. 7 shows the overvoltage protection element connected in a multiline overvoltage protection circuit.

FIG. 7 shows a piece cut from a sheet to form element 31 having conductive ground plane 32 is affixed to the underside of the sheet in conductive contact with the non-linear material extending to the lower surface 33. A plurality of separate leads 34 are applied to the upper surface 36 to be in intimate contact with the non-linear material extending to that surface. The electrodes 34 extend beyond the element and can be connected to associated electrical circuits. The bottom plate 32 can be grounded whereby excessive voltage on any of the associated electrical leads 34 causes switching of the material between the corresponding electrode 34 and ground. The leads 34 and ground plane 32 can be laminated to the element 31 by heat and pressure. Alternative conductive adhesives may be applied to the surfaces and the leads and member adhered to the surface in electrical contact with the non-linear material. An alternative would be to mechanically impress the conductive traces 34 and ground plane 32 to the element 21. The leads or traces 34 may be formed by printed wiring techniques. That is, a sheet of conductive material may be applied and placed in intimate contact with the upper surface. Then by photolithographic techniques, selected regions of the conductive material are exposed whereby they may be etched away by acid or the like to leave traces 34.

Thus, there has been provided an overvoltage protection element formed from an impregnated fabric which is easy to manufacture with controllable electrical characteristics. The element is adaptable for many applications for a multi-line circuit protection such as in connectors, printed circuit boards, and the like.

We claim:

1. An overvoltage protection element comprising an insulating fabric formed from a plurality of interlaced threads having first and second parallel spaced major surfaces which determine the thickness of the element, said fabric including a plurality of interstices between said threads, and a non-linear electrical switching material filling the interstices and extending between the first and second spaced major surfaces of said fabric, said switching material having an on-state resistance providing for electrical conduction between the first and second spaced major surfaces in response to an overvoltage condition and a high off-state resistance in the absence of an overvoltage condition wherein said non-linear electrical switching material comprises a binder and closely spaced conductive particles homogeneously distributed in said binder and spaced to provide conduction by quantum mechanical tunneling.

2. An overvoltage protection element as in claim 1 including a conductive ground plane on one of said major surfaces in conductive contact with the non-linear material.

3. An overvoltage protection element as in claim I in which the first and second major surfaces are spaced a predetermined distance to establish the voltage breakdown characteristics of said element.

4. An overvoltage protection element as in claim 1 in which the sheet of insulating fabric is a material selected from the group including natural, synthetic, ceramic or refractory fibers.

5. An overvoltage protection element as in claim 4 in which the fabric is silk.

6. An overvoltage protection element as in claim 1 in which the first and second major surfaces are spaced between 0.001 to 0.100 inches.

7. An overvoltage protection element as in claim 1 in which the binder is a medium durometer fluorosilicon rubber and the conductive particles are aluminum powder.

8. An overvoltage protection element as in claim 7 in which the fabric is silk.

9. An overvoltage protection element as in claim 1 in which the fabric is silk and the nonlinear electrical switching material comprises a fluorosilicon rubber and uniformly distributed aluminum powder.

10. An overvoltage protection element comprising an insulating fabric formed from a plurality of interlaced threads having first and second parallel spaced major surfaces which determine the thickness of the element, said fabric including a plurality of interstices between said threads, and a non-linear electrical switching material filling said interstices and extending between said first and second spaced major surfaces of said fabric, said switching material being positioned between and in electrical contact with first and second conductive members to provide switching between said conductive members in response to an overvoltage condition wherein said non-linear electrical switching material comprises a binder and closely spaced conductive particles homogeneously distributed in said binder and spaced to provide conduction by quantum mechanical tunneling.

* * * * *